(12) United States Patent
Okayama et al.

(10) Patent No.: US 6,462,783 B1
(45) Date of Patent: Oct. 8, 2002

(54) PICTURE ENCODING METHOD AND APPARATUS

(75) Inventors: Masataka Okayama, Ebina (JP); Takeo Tomokane, Yokohama (JP); Hisashi Inoue, Kashiwa (JP); Takeshi Ogino, Alpharetta, GA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/136,683

(22) Filed: Aug. 19, 1998

(30) Foreign Application Priority Data

Aug. 22, 1997 (JP) .............................................. 9-226425

(51) Int. Cl.[7] ................................................ H04N 5/46
(52) U.S. Cl. ........................ 348/556; 348/577; 348/582; 375/240.29
(58) Field of Search ................................. 348/556, 561, 348/562, 581, 582, 913, 441, 445, 458, 586, 596, 576, 577, 704, 345; 386/33, 131, 109, 111; 375/240.29; H04N 5/46, 5/14, 9/74

(56) References Cited

U.S. PATENT DOCUMENTS

| | | | | |
|---|---|---|---|---|
| 5,351,135 A | * | 9/1994 | Saeger | 348/435 |
| 5,455,632 A | * | 10/1995 | Ichihara | 348/565 |
| 5,534,940 A | * | 7/1996 | Sato et al. | 348/556 |
| 5,798,752 A | * | 8/1998 | Buxton et al. | 345/146 |
| 5,862,297 A | * | 1/1999 | Timmermans | 386/70 |
| 6,226,449 B1 | * | 5/2001 | Inoue et al. | 386/120 |
| 6,246,719 B1 | * | 6/2001 | Agarwal | 375/240.16 |
| 6,295,546 B1 | * | 9/2001 | Adiletta | 708/402 |

OTHER PUBLICATIONS

"A Point–by–Point Illustrated Approach to the Latest MPEG Techniques," Japanese publication from ASCII Publishing Co.

"Digital Video Technology: A Simple Approach", Japanese publication from NHK Publishing Co.

* cited by examiner

*Primary Examiner*—Michael H. Lee
*Assistant Examiner*—Trang U. Tran
(74) *Attorney, Agent, or Firm*—Mattingly, Stanger & Malur, P.C.

(57) ABSTRACT

A picture recording method for recording original picture data encodes the original picture so that the entirety of the original picture is displayed at its original resolution on a television monitor after being decoded. The method involves first scaling down an original picture image, then filling top, bottom, and left and right side regions around the scaled down picture image with pixels to attain a picture image that is of the same size and resolution as that of the original picture image. The scaled down and filled in image is then recorded by encoding and storing the picture data at the original resolution. The recorded picture data is then subsequently decoded for displaying all pixels of the original picture image at the original resolution on a television monitor.

5 Claims, 6 Drawing Sheets

PICTURE ENCODING METHOD AND APPARATUS

FIELD OF THE INVENTION

The present invention relates to a picture recording method and an information processor performing the method. More particularly, the invention relates to a method for encoding picture data to be output onto a television monitor, as well as to an information processor that encodes the picture data according to the method. The invention further relates to a presentation system that performs picture encoding and display.

BACKGROUND OF THE INVENTION

In recent years, when great quantities of picture data representing still and moving pictures are to be stored or transmitted, it has been customary to encode the picture data to reduce its size.

Today, one of the most widely recognized international standards for encoding still picture data is the algorithm recommended by the JPEG (Joint Photographic Experts Group) composed of experts from two organizations: the ISO (International Organization for Standardization) and the CCITT (International Telegraph and Telephone Consultative Committee; later reorganized into the ITU-T, which is the International Telecommunication Union—Telecommunication Standards Sector).

On the other, the algorithm recommended by the MPEG (Moving Picture Experts Group), a subordinate group of the ISO, is widely recognized as the preferred international standard for encoding moving picture data.

In the description that follows, picture data encoded by the JPEG algorithm will be referred to as JPEG data and data encoded by the MPEG algorithm as MPEG data. The techniques involved are detailed illustratively in "A Point-by-Point Illustrated Approach to the Latest MPEG Techniques," a Japanese publication from ASCII Publishing Co. in Japan.

SUMMARY OF THE INVENTION

Suppose that a picture with a resolution of 704×480 pixels is encoded conventionally, i.e., by the JPEG algorithm and that the encoded data is later decoded for display on a television monitor. In such a case, as described in "Digital Video Technology: A Simple Approach" (a Japanese publication from NHK Publishing Co.), not all of the data representing the resolution of 704×480 pixels are displayed on the television monitor because of fuzziness caused by interlaced scanning of the television set.

It is therefore an object of the present invention to provide a picture recording method for recording original picture data in such a manner that when the data is recorded, the original picture in its entirety will be displayed at its original resolution on a television monitor; and more specifically to provide a picture encoding method for encoding original picture data in such a manner that when the encoded data is decoded, the original picture in its entirety will be displayed at its original resolution on a television monitor.

It is another object of the invention to provide an information processor for encoding original picture data in such a manner that when the encoded data are decoded, the original picture in its entirety will be displayed at its original resolution on a television monitor.

It is a further object of the invention to provide a picture processing system for encoding original picture data in such a manner that when the encoded data are decoded, the original picture in its entirety will be displayed at its original resolution on a television monitor, the picture processing system further transmitting the encoded original picture data to a separate information processor of a highly portable type, such as a digital still camera, which in turn decodes the received data to display the original picture in its entirety at its original resolution on a television monitor connected to the information processor.

In achieving the foregoing and other objects of the present invention and according to one aspect thereof, there is provided a picture encoding method that begins with scaling down an original picture image and filling the top, bottom, and left and right side regions around the scaled down picture image with pixels having suitable color information for attaining an original resolution of the original picture image so that the original picture image is encoded at the original resolution. Then, the encoded picture data is decoded for displaying all pixels of the original picture image at the original resolution on a television monitor.

Figure 4:
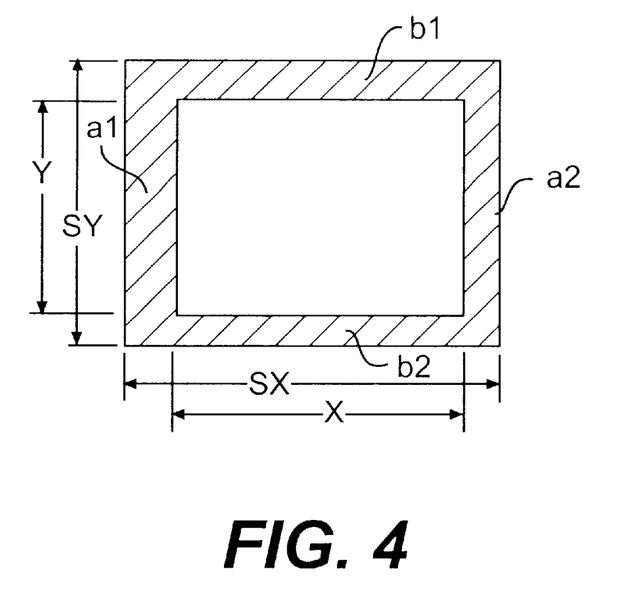
FIG. 4 is another diagram used in explaining the preferred embodiments of the invention.

Preferably, according to the invention, the picture encoding method includes scaling down the original picture image while meeting the conditions of $$X=SX-(a1+a2)$$

$$Y=SY-(b1+b2)$$

where, as shown in FIG. 4, X stands for a width of the scaled down picture image, Y for a height of the scaled down picture image, SX for a width of the original picture image yet to be scaled down, SY for a height of the original picture image, a1 for a width of a group of pixels filling the region on the left side of the scaled down picture image, a2 for a width of a group of pixels filling the region on the right side of the scaled down picture image, b1 for a height of a group of pixels filling the region on top of the scaled down picture image, b2 for a height of a group of pixels filling the region at the bottom of the scaled down picture image; wherein a1, a2, b1 and b2 are any integers which are larger than 0 and which further satisfy the conditions of a1<SX, a2<SX, b1<SY, and b2<SY.

DETAILED DESCRIPTION OF THE PREFERRED EMBODIMENTS

Preferred embodiments of the invention will now be described with reference to the accompanying drawings.

Although the embodiments to be described discuss using the JPEG algorithm, the invention is not limited to that algorithm alone.

Figure 2:
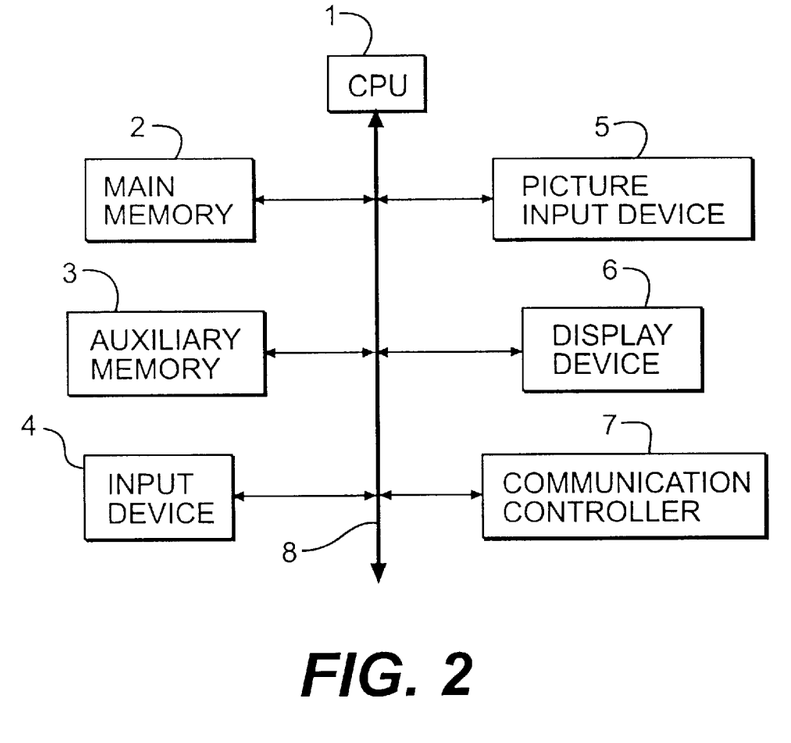
FIG. 2 is a block diagram showing a suitable hardware configuration of a picture encoding apparatus for performing the picture encoding and display according to the invention.

FIG. 2 is a block diagram showing a hardware configuration of an information processor such as a personal computer that is suitable as a picture encoding apparatus used in accordance with the present invention.

As shown in FIG. 2, the picture encoding apparatus includes a CPU 1, a main memory 2, an auxiliary memory 3, an input device 4, a picture input device 5, a display device 6, and a communication controller 7. The components of the apparatus are interconnected by a bus 8 so that necessary information may be exchanged therebetween.

The main memory 2 primarily performs two functions. First, the main memory functions as a work area, and second as a storage for accommodating necessary programs. The first function may be implemented, for example, by a RAM and the second by a ROM. The auxiliary memory 3 stores programs that control the operation of the picture encoding apparatus 20, and also stores encoded or decoded pictures. Illustratively, the auxiliary memory 3 may be implemented in the form of a floppy disk drive, a hard disk drive, a DVD-ROM, a DVD-RAM, a CD-ROM, an MO, and/or a memory card.

The input device 4 is used for inputting necessary instructions and information. This device may be implemented illustratively in the form of a keyboard, a remote controller, and/or a pointing device such as a mouse or a joystick. The picture input device 5 is for inputting analog or digital data pictures. This device may be implemented illustratively in the form of a CCD camera, a video camera, a VTR, a television set, a television tuner or a scanner.

The display device 6 is for displaying pictures to be encoded and other diverse kinds of information. This device may be implemented illustratively in the form of a CRT, an EL display, a plasma display or a liquid-crystal display. The communication controller 7 is for connecting the apparatus with a telephone line, with a communication network such as a LAN, or with a separate information processor. This controller may be implemented illustratively in the form of a network adapter or a modem.

The CPU 1 executes programs stored in advance in the main memory 2 or auxiliary memory 3. The programs used by the embodiments described below for encoding pictures are read from the main memory 2 or auxiliary memory 3 and executed by the CPU 1. The picture input device 5 may take the place of the CPU 1 in encoding input pictures. Pictures to be encoded may be any of those stored in the main memory 2 or auxiliary memory 3, those input from the picture input device 5, those displayed on the display device 6, or those transferred through the communication controller 7.

Of the components making up the picture encoding apparatus 20, those not directly associated with the input or output of pictures or programs are optional and may be omitted from the arrangement shown in FIG. 2.

A detailed description of a picture encoding method implemented by programs operating on the picture encoding apparatus 20 and held in the main memory 2 or auxiliary memory 3 is as follows. The programs are executed by the CPU 1 in response to an appropriate event such as the input of an instruction from a user through the input device 4. The picture encoding method of a preferred embodiment of the invention is described with reference to a flowchart of FIG. 1. Although the example below will be shown using primarily the JPEG algorithm in encoding pictures displayed on the display device 6, this is not limitative of the invention.

Figure 1:
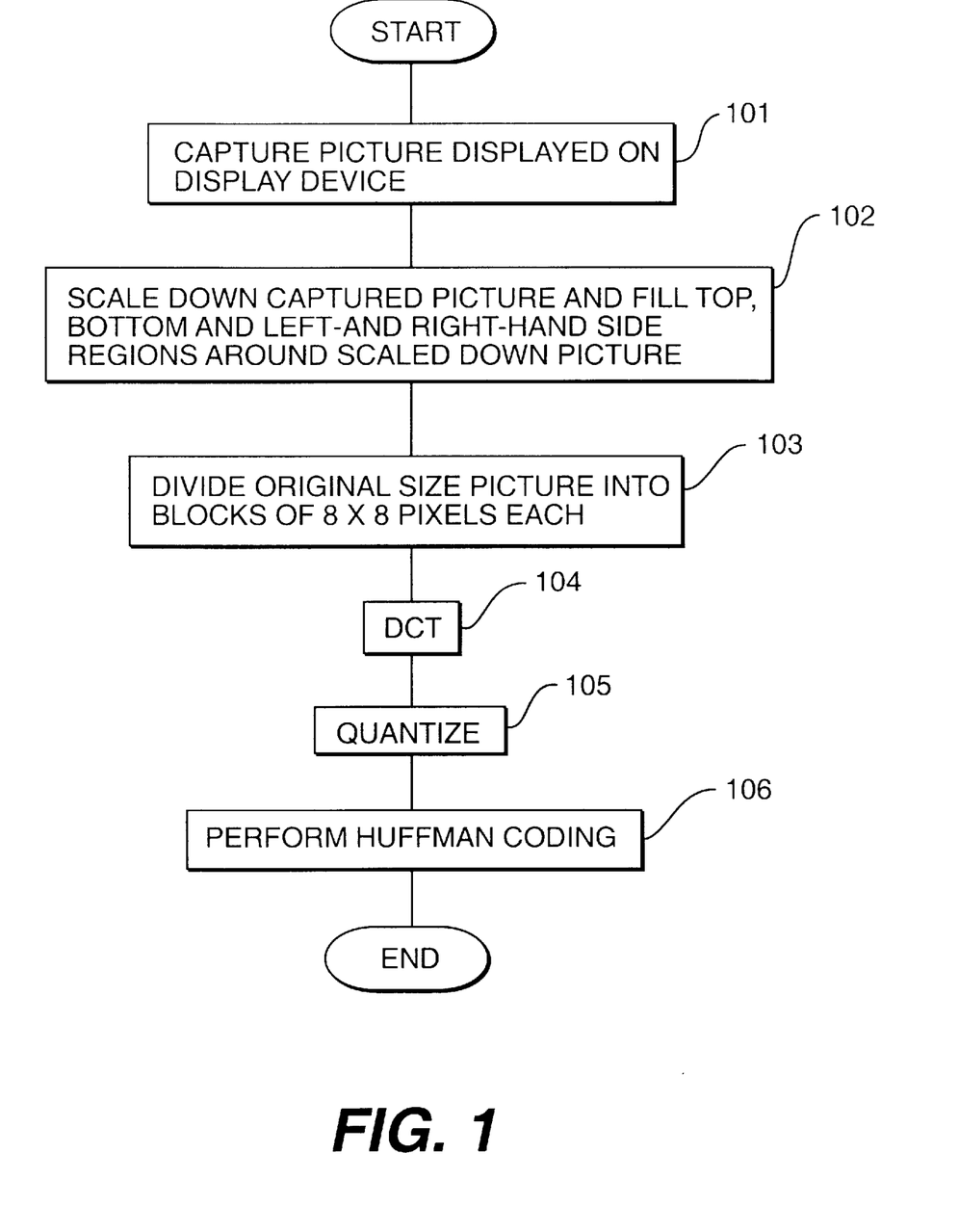
FIG. 1 is a flowchart of the steps followed in performing the picture encoding method embodying the invention.
Figure 3A:
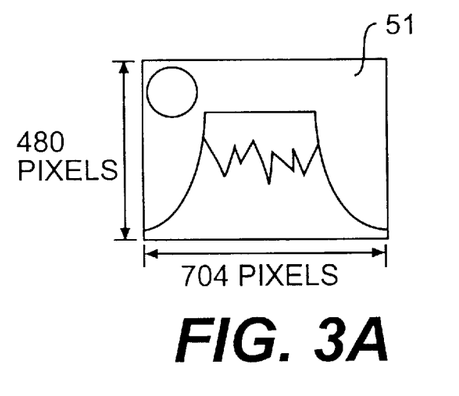
FIGS. 3A and 3B are diagrams used in explaining the preferred embodiments of the invention.

As shown in FIG. 1, a picture appearing on the display device 6 is first captured into the main memory (step 101). It is assumed here that the size of any picture to be captured is determined before, that the display device 6 has a resolution of at least 704×480 pixels, and that the target picture size is 704×480 pixels. FIG. 3A shows an example of a picture image captured and stored in the memory. In FIG. 3A, the picture image 51 is that which is captured in step 101.

Figure 3B:
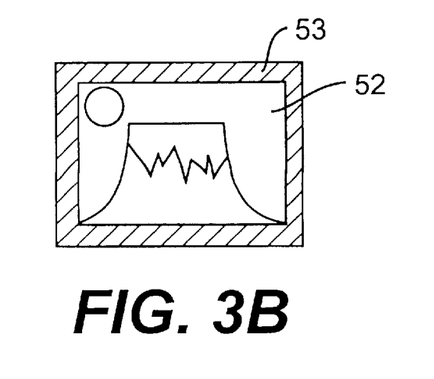

Returning to FIG. 1, the picture captured in step 101 is then scaled down (step 102). The picture is scaled down by calculating an average of two adjacent pixels in the picture data. After the scaling down, the picture is treated as one with 704×480 pixels. At the end of step 102, the scaled down picture image 52 to be encoded appears as shown in FIG. 3B. In step 102, with the picture image 51 scaled down, the top, bottom, and left and right side regions around the scaled down picture image 52 are filled with pixels having suitable color information so that the size of the picture image 53 to be encoded will be of the original picture size. The filled in pixels may usually have the color of black which complements the border color of the television monitor. Alternatively, any other color may be used. Additionally, the frames or border lines enclosing the images 51, 52 and 53, as shown in FIGS. 3A and 3B, are shown only for illustrative purposes and do not exist unless they are specifically included in the actual picture image.

In step 102 of FIG. 1, it is assumed that as shown in FIG. 4, parameter X stands for a width of the scaled down picture image, Y for a height of the scaled down picture image, SX for a width of the original picture image yet to be scaled down, SY for a height of the original picture image, a1 for a width of a group of pixels filling the region on the left side of the scaled down picture image, a2 for a width of a group of pixels filling the region on the right side of the scaled down picture image, b1 for a height of a group of pixels filling the region on top of the scaled down picture image, and b2 for a height of a group of pixels filling the region at the bottom of the scaled down picture image. These parameters should satisfy the following equations:

$$X = SX - (a1 + a2)$$

$$Y = SY - (b1 + b2)$$

where, a1, a2, b1 and b2 are any integers which are larger than 0 and which further satisfy the conditions of a1<SX, a2<SX, b1<SY, and b2<SY.

Returning to FIG. 1, the picture image 53, which includes the scaled down image portion 52 and the filled in portion (border area around the picture image 52 that is filled in with pixels), as shown in FIG. 3B, is divided into 8×8 pixel blocks (step 103). Specifically, the picture image 52 is divided into 88 blocks horizontally and 60 blocks vertically. Each of the divided pixels blocks is subjected to DCT (discrete cosine transform), a type of orthogonal transformation (step 104). In the description that follows, the blocks that have undergone DCT will be called DCT coefficient blocks. As with pixel blocks, the DCT coefficient blocks are composed of 8×8 pixels each. Each of the DCT coefficient blocks is quantized by use of a quantization table. The quantization table comprises 8×8 blocks of any quantized values. Quantization is carried out by dividing the DCT coefficients constituting a DCT coefficient block by the quantized value corresponding to the quantization table in effect. The blocks obtained by quantizing the DCT coefficient blocks will be referred to as quantized DCT coefficient blocks hereunder.

Finally, the quantized DCT coefficient blocks are subjected to Huffman coding (step 106), a kind of entropy coding. This terminates the processing of FIG. 1. In Huffman coding, two-dimensional 8×8 blocks are led as one-dimensional data. That is, Huffman codes are assigned to combinations of zero run length and categories indicating the magnitude of values to be encoded. The data having undergone the Huffman coding is JPEG data. Besides Huffman-coded data, the JPEG data includes picture data information such as pixel counts representing the crosswise and lengthwise dimensions of the pictures (i.e., picture sizes), and quantization and Huffman tables used in the coding.

In the processing of FIG. 1, the picture image captured in step 101 and then scaled down continues to be led as a 704×480 pixel picture when encoded later by the JPEG algorithm. The reason for performing the process of step 102 is described below in detail with reference to FIGS. 5A and 5B.

Figure 5A:
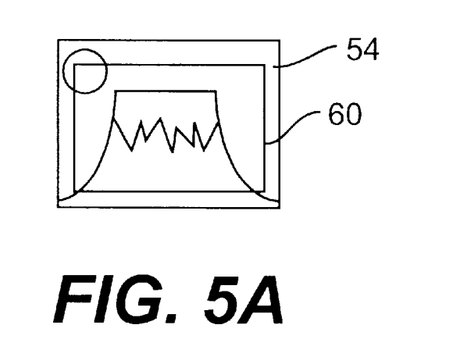
FIGS. 5A and 5B are also diagrams used in explaining the preferred embodiments of the invention.

Suppose that a picture with 704×480 pixels is encoded only in a conventional fashion (i.e., steps 103 through 106 in FIG. 1) and that the encoded JPEG data are then decoded for display on a television monitor 60. In that case, as shown in FIG. 5A, the television monitor 60 is incapable of displaying a picture image 54 in its entirety. This is because, as mentioned earlier, fuzziness caused by interlaced scanning of the television monitor 60 prevents some of the data representing the resolution of all 704×480 pixels from appearing on the monitor screen. Even where the original picture to be scaled down and encoded is smaller than the 704×480 format (e.g., with 352×240 pixels), not all pixels of the picture can be displayed on the television monitor 60.

Figure 5B:
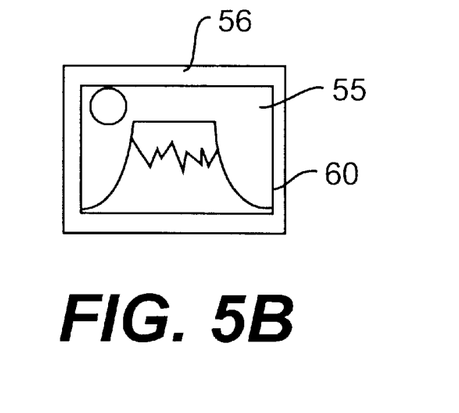

According to the invention, therefore, in step 102 of FIG. 1 all pixels of the picture image 54 are scaled down into the size of the picture image 55 so that the entire picture is displayed on the television monitor 60. Step 102 also involves subjecting to JPEG encoding the picture image 56 having the same size as that of the picture image 54 (704×480 pixels). As a result, the picture image 54 with all its pixels may be displayed on the television monitor 60. At this point, those portions of the picture image 56 which are not displayed on the television monitor 60 are filled with pixels having suitable color information.

Figure 6:
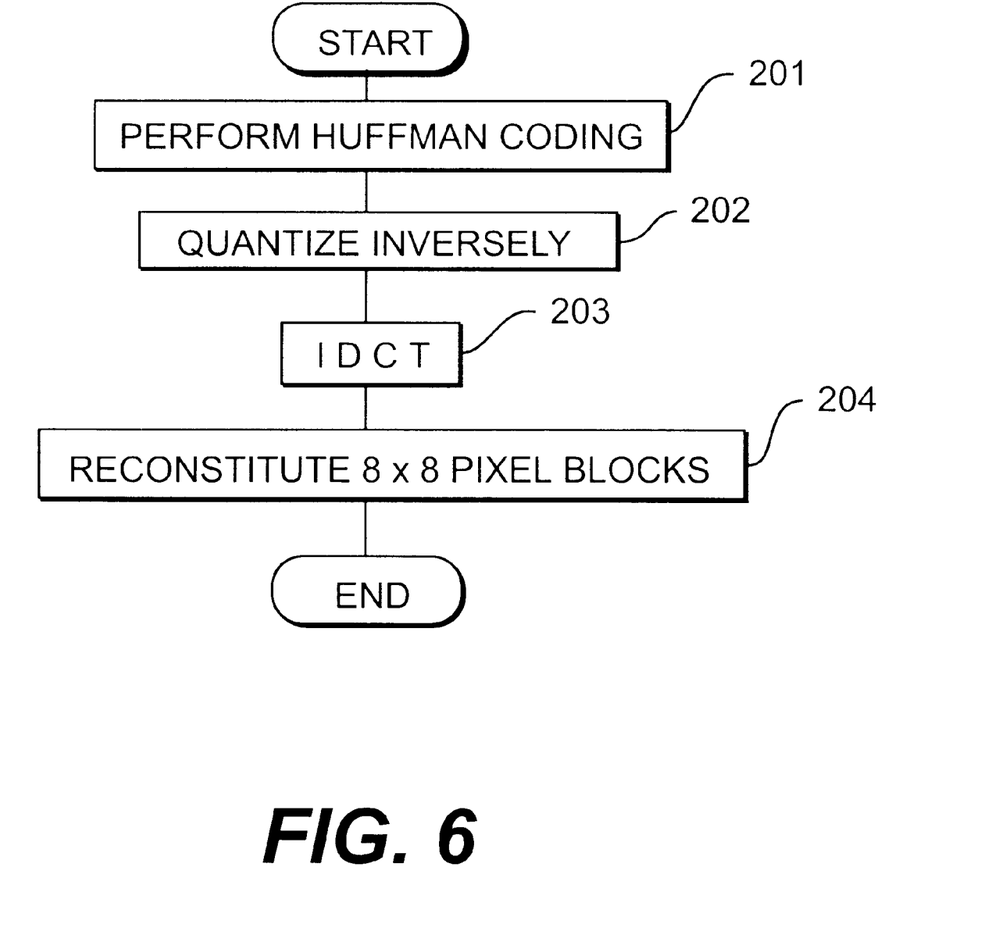
FIG. 6 is a flowchart of the steps followed in the decoding of JPEG data.

FIG. 6 is a flowchart of the steps for decoding JPEG data for display on a television monitor. Initially, the Huffman-coded JPEG data are decoded by use of the Huffman table included in the JPEG data in order to obtain quantized DCT coefficient blocks (step 201). The quantized DCT coefficient blocks are then inversely quantized by use of the quantization table so as to be decoded back to DCT coefficient blocks (step 202). The decoded blocks are subjected to IDCT (inverse DCT) and reverted to 8×8 pixel blocks (step 203). The 8×8 pixel blocks thus decoded are reconstituted into the original picture data (step 204).

Figure 7A:
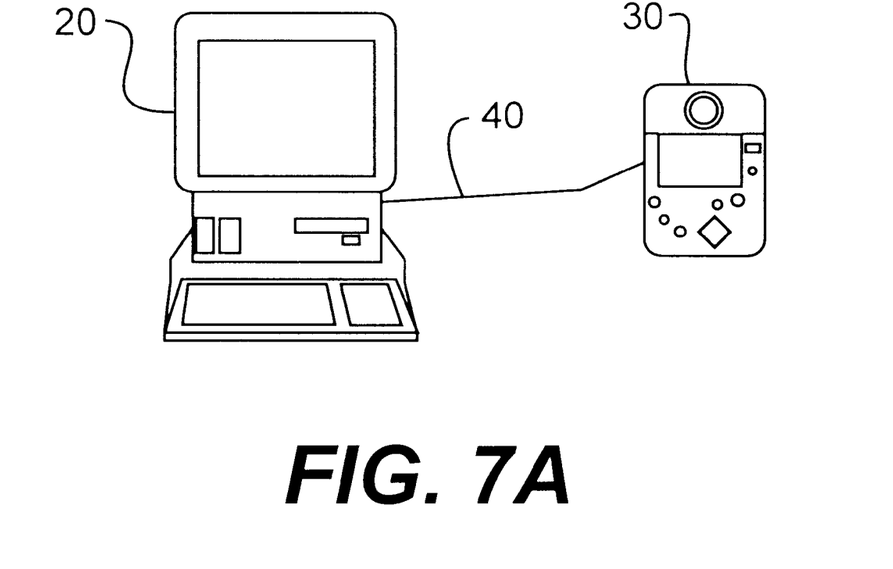
FIGS. 7A and 7B are schematic views showing a system embodying the invention.

A presentation system operating on the picture encoding method embodying the invention will now be described with reference to FIGS. 7A and 7B. In FIG. 7A, reference numeral 20 stands for a picture encoding apparatus with functions for encoding pictures based on the picture encoding method according to the invention, and 30 denotes a digital still camera of a highly portable type. The picture encoding apparatus 20 and the digital still camera 30 are interconnected by a cable 40 that is connected to suitable interface units of the two devices. The interface unit for the picture encoding apparatus 20 is illustratively the communication controller 7 shown in FIG. 2. The digital still camera 30 is assumed to be capable of decoding pictures that were encoded by the picture encoding apparatus 20.

Figure 7B:
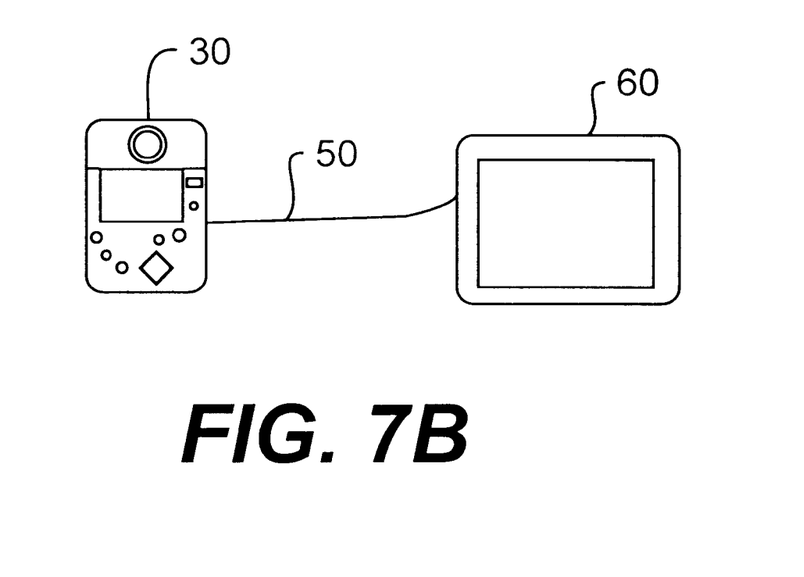

In FIG. 7B, reference numeral 60 represents either a monitor attached to a television set or a television monitor. The digital still camera 30 and the television monitor 60 are interconnected by a cable 50 which is illustratively a video cable. The digital still camera 30 decodes internally stored picture data encoded by the JPEG algorithm, and sends the decoded data over the cable 50 to the television monitor 60 for display thereon.

The operation of the presentation system of FIGS. 7A and 7B is described as follows, with reference to the flowchart of FIG. 8.

Figure 8:
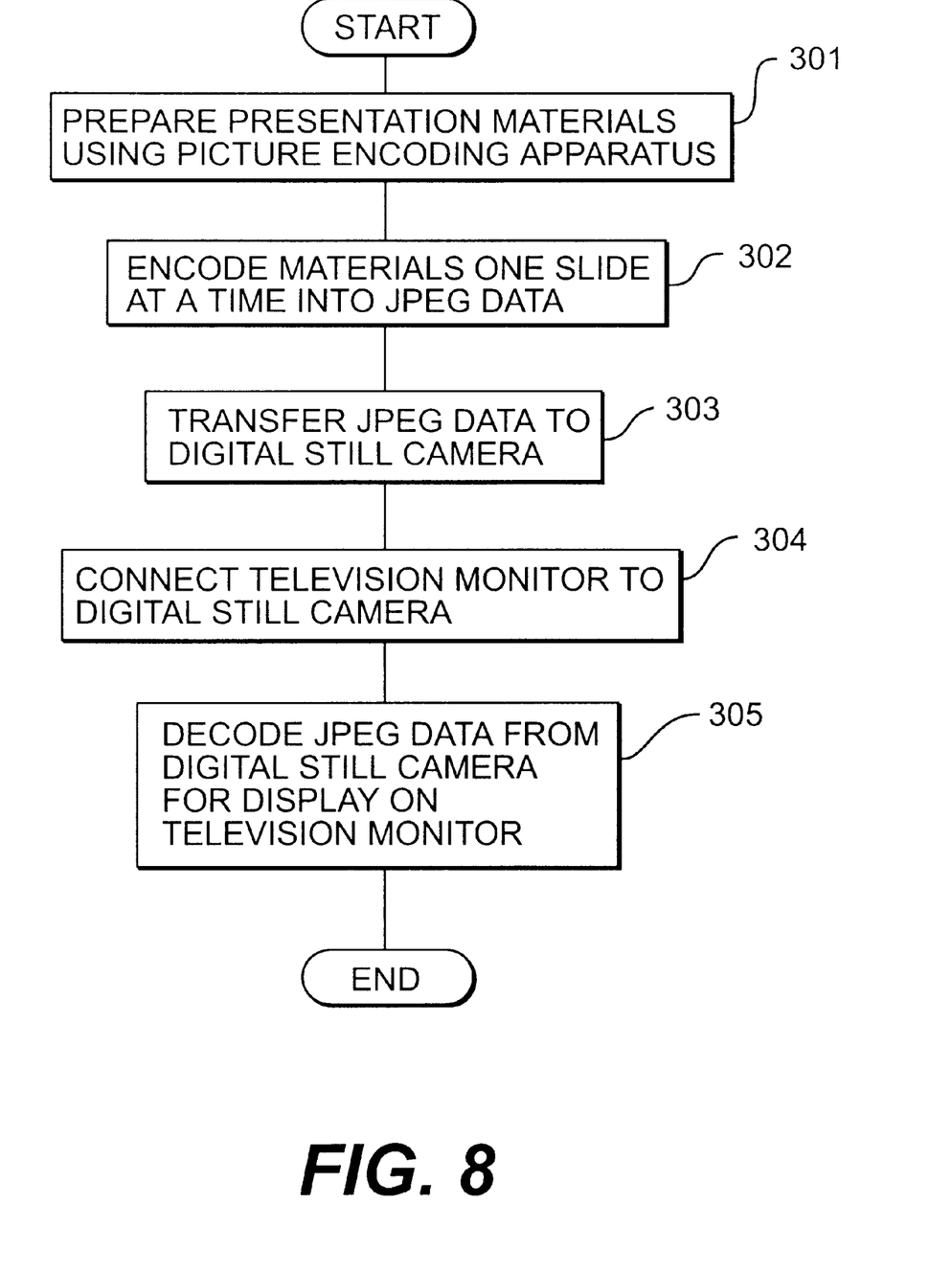
FIG. 8 is a flowchart of the steps followed in operating the system of the invention.

As shown in FIG. 8, the user first prepares presentation materials (typically slides) using suitable presentation software, e.g. Microsoft PowerPoint® on the picture encoding apparatus 20 (step 301). Then the slides are encoded one at a time into JPEG data by the picture encoding method (step 302). At this point, in response to an appropriate event such as the input of an instruction from the user, the picture images of the slides are either developed in the main memory of the picture encoding apparatus 20 or displayed on the display device of the apparatus 20 so that the developed or displayed picture images are encoded by the JPEG algorithm.

The user then connects the digital still camera 30 to the picture encoding apparatus 20. In predetermined circumstances such as in the event of an instruction input from the user, the JPEG data group prepared in step 302 is transferred to the digital still camera over the cable 40 (step 303). If the picture encoding apparatus 20 and the digital still camera 30 both have removable auxiliary memories, JPEG data transfer may be effected by use of these removable memories.

The television monitor 60 is then connected to the digital still camera 30 through the video cable 50 (step 304). The digital still camera 30 decodes pictures of the JPEG data one slide at a time (i.e., the original pictures are slides for presentation), the data having been stored into the camera 50 in step 303. The decoded pictures are displayed successively on the television monitor (step 305). Because each original picture image was scaled down and encoded by the JPEG algorithm in step 302, the scaled down image being surrounded by top, bottom, and left and right side regions filled with pixels having suitable color information, the decoded data allow each original picture to be restored in its entirety when displayed on the television monitor 60.

As described, the picture encoding method and apparatus of the invention allow the user to carry previously prepared presentation materials in a portable digital still camera. On arrival at a site where a presentation is to take place, the user may connect the digital still camera to a television monitor and get all presentation materials displayed on the monitor screen. This arrangement provides a presentation system that is easy to use and highly portable.

Although the picture encoding method as embodied above utilizes the JPEG algorithm for encoding, this is not limitative of the invention; any other suitable encoding algorithms may be used. Illustratively, where the MPEG algorithm is employed to have moving pictures displayed on a television monitor, steps 103 through 106 of FIG. 1 need only be performed in accordance with the MPEG encoding procedure. For decoding MPEG data, the relevant steps in FIG. 6 need only be replaced by those related to the MPEG decoding procedure. The size of the original pictures to be encoded may be determined as desired. For example, moving pictures with a resolution of 352×240 pixels may be encoded by the MPEG algorithm and, when subsequently decoded, may be displayed at their original resolution on the television monitor screen.

As described, the picture encoding method according to the invention encodes original picture data in such a manner that upon decoding of the encoded data, the original picture in its entirety will be displayed at its original resolution on a television monitor.

As discussed, the picture encoding apparatus according to the invention encodes original picture data in such a manner that when the encoded data are decoded, the original picture in its entirety will be displayed at its original resolution on a television monitor.

Furthermore, the picture processing system according to the invention encodes original picture data in such a manner that upon decoding of the encoded data, the original picture in its entirety will be displayed at its original resolution on a television monitor, the picture processing system further transmitting the encoded original picture data to a separate information processor of a highly portable type such as a digital still camera which in turn decodes the received data to display the original picture in its entirety at its original resolution on a television monitor connected to the information processor.

While preferred embodiments have been set forth with specific details, further embodiments, modifications and variations are contemplated according to the broader aspects of the present invention, all as determined by the spirit and scope of the following claims.

We claim:

1. A picture encoding method comprising the steps of:

scaling down an original unencoded picture image;

filling top, bottom, and left and right side regions around the scaled down picture image with pixels having predetermined color information for attaining an original resolution of said original picture image;

encoding said scaled down and filled in picture image as encoded picture data so that said original picture image is encoded at said original resolution;

wherein the encoded picture data is displayed with all pixels of said original picture image at said original resolution on a television monitor;

wherein said step of scaling down an original picture image scales down an uncoded picture image as said original picture image and wherein said encoding step includes encoding said scaled down and filled in picture image as encoded picture data;

further comprising the step of scaling down said original picture image while satisfying the conditions of $X = SX - (a1+a2)$ $Y = SY - (b1+b2)$ where, X stands for a width of said scaled down picture image, Y for a height of said scaled down picture image, SX for a width of said original picture image yet to be scaled down, SY for a height of said original picture image, a1 for a width of a group of pixels filling the region on the left side of said scaled down picture image, a2 for a width of a group of pixels filling the region on the right side of said scaled down picture image, b1 for a height of a group of pixels filling the region on top of said scaled down picture image, b2 for a height of a group of pixels filling the region at the bottom of said scaled down picture image; and wherein a1, a2, b1 and b2 are any integers which are larger than 0 and which further satisfy the conditions of a1<SX, a2<SX, b1<SY, and b2<SY.

2. A computer readable storage medium on which is stored executable instructions representing a picture encoding program, wherein execution of the instructions causes a data processor to perform the steps of:

scaling down an original unencoded picture image;

filling top, bottom, and left and right side regions around the scaled down picture image with pixels having predetermined color information for attaining an original resolution of said original picture image;

encoding said scaled down and filled in picture image as encoded picture data so that said original picture image is encoded at said original resolution;

wherein the encoded picture data is displayed with all pixels of said original picture image at said original resolution on a television monitor;

wherein said step of scaling down an original picture image scales down an uncoded picture image as said original picture image and wherein said encoding step includes encoding said scaled down and filled in picture image as encoded picture data;

wherein said step of scaling down said original picture image is performed while satisfying the conditions of $X = SX - (a1+a2)$ $Y = SY - (b1+b2)$ where, X stands for a width of said scaled down picture image, Y for a height of said scaled down picture image, SX for a width of said original picture image yet to be scaled down, SY for a height of said original picture image, a1 for a width of a group of pixels filling the region on the left side of said scaled down picture image, a2 for a width of a group of pixels filling the region on the right side of said scaled down picture image, b1 for a height of a group of pixels filling the region on top of said scaled down picture image, b2 for a height of a group of pixels filling the region at the bottom of said scaled down picture image; and wherein a1, a2, b1 and b2 are any integers which are larger than 0 and which further satisfy the conditions of a1<SX, a2<SX, b1<SY, and b2<SY.

3. A picture encoding apparatus comprising:

a display device for displaying picture data;

a processor;

a picture information storage device;

wherein, for encoding an original unencoded picture image displayed on said display device in said picture information storage device, said processor scales down the displayed picture image and fills top, bottom, left and right side regions around the scaled down picture image with pixels having predetermined color information for attaining an original resolution of said original picture image and wherein said scaled down and filled in picture image is stored as encoded picture data so that said original picture image is encoded at said original resolution;

wherein the encoded picture data is displayed with all pixels of said original picture image at said original resolution on a television monitor;

wherein said original unencoded picture image is an uncoded picture image and wherein said processor encodes said scaled down and filled in picture image as encoded picture data for encoding said encoded picture data in said picture information storage device;

wherein said processor scales down said original picture image displayed on said display device while satisfying the conditions of $X = SX - (a1+a2)$ $Y = SY - (b1+b2)$ where, X stands for a width of said scaled down picture image, Y for a height of said scaled down picture image, SX for a width of said original picture image yet to be scaled down, SY for a height of said original picture image, a1 for a width of a group of pixels filling the region on the left side of said scaled down picture image, a2 for a width of a group of pixels filling the region on the right side of said scaled down picture image, b1 for a height of a group of pixels filling the region on top of said scaled down picture image, b2 for a height of a group of pixels filling the region at the bottom of said scaled down picture image; and wherein a1, a2, b1 and b2 are any integers which are larger than 0 and which further satisfy the conditions of a1<SX, a2<SX, b1<SY, and b2<SY.

4. A picture encoding apparatus comprising:

a picture input device for inputting pictures;

a processor;

a picture information storage device;

wherein, for encoding an original unencoded picture image input from said picture input device in said picture information storage device, said processor scales down the displayed picture image and fills top, bottom, left and right side regions around the scaled down picture image with pixels having predetermined color information for attaining an original resolution of said original picture image and wherein said scaled down and filled in picture image is stored as encoded picture data so that said original picture image is encoded at said original resolution;

wherein the encoded picture data is displayed with all pixels of said original picture image at said original resolution on a television monitor;

wherein said original unencoded picture image is an uncoded picture image and wherein said processor encodes said scaled down and filled in picture image as encoded picture data for encoding said encoded picture data in said picture information storage device;

wherein said processor scales down said original picture image while satisfying the conditions of $$X=SX-(a1+a2)$$

$$Y=SY-(b1+b2)$$

where, X stands for a width of said scaled down picture image, Y for a height of said scaled down picture image, SX for a width of said original picture image yet to be scaled down, SY for a height of said original picture image, a1 for a width of a group of pixels filling the region on the left side of said scaled down picture image, a2 for a width of a group of pixels filling the region on the right side of said scaled down picture image, b1 for a height of a group of pixels filling the region on top of said scaled down picture image, b2 for a height of a group of pixels filling the region at the bottom of said scaled down picture image; and wherein a1, a2, b1 and b2 are any integers which are larger than 0 and which further satisfy the conditions of a1<SX, a2<SX, b1<SY, and b2<SY.

5. A presentation system comprising:

a picture encoding apparatus;

an information processor for decoding picture data encoded by said picture encoding apparatus;

a television monitor;

wherein, for encoding an original unencoded picture image displayed on said display device in said picture information storage device, said processor scales down the displayed picture image and fills top, bottom, left and right side regions around the scaled down picture image with pixels having predetermined color information for attaining an original resolution of said original picture image and wherein said scaled down and filled in picture image is stored as encoded picture data so that said original picture image is encoded at said original resolution;

wherein the encoded picture data is displayed with all pixels of said original picture image at said original resolution on a television monitor;

wherein said original unencoded picture image is an uncoded picture image and wherein said processor encodes said scaled down and filled in picture image as encoded picture data for encoding said encoded picture data in said picture information storage device;

wherein said processor scales down said original picture image while satisfying the conditions of $$X=SX-(a1+a2)$$

$$Y=SY-(b1+b2)$$

where, X stands for a width of said scaled down picture image, Y for a height of said scaled down picture image, SX for a width of said original picture image yet to be scaled down, SY for a height of said original picture image, a1 for a width of a group of pixels filling the region on the left side of said scaled down picture image, a2 for a width of a group of pixels filling the region on the right side of said scaled down picture image, b1 for a height of a group of pixels filling the region on top of said scaled down picture image, b2 for a height of a group of pixels filling the region at the bottom of said scaled down picture image; and wherein a1, a2, b1 and b2 are any integers which are larger than 0 and which further satisfy the conditions of a1<SX, a2<SX, b1<SY, and b2<SY.

* * * * *